United States Patent [19]

Brophy et al.

[11] Patent Number: 4,767,569

[45] Date of Patent: Aug. 30, 1988

[54] PROCESS FOR PRODUCING SYNTHESIS GAS BY PARTIAL COMBUSTION OF HYDROCARBONS

[75] Inventors: John H. Brophy, Camberley; Felix J. Weinberg, London, both of England

[73] Assignee: The British Petroleum Company p.l.c., London, England

[21] Appl. No.: 70,644

[22] Filed: Jul. 6, 1987

Related U.S. Application Data

[63] Continuation of Ser. No. 800,124, filed as PCT GB85/00141, Apr. 2, 1985, published as WO85/04647, Oct. 24, 1985, abandoned.

[30] Foreign Application Priority Data

Apr. 5, 1984 [GB] United Kingdom ............... 8408804

[51] Int. Cl.$^4$ ........................... C01B 3/28; C01B 3/30
[52] U.S. Cl. .................................... 252/373; 585/415; 585/540; 585/541; 585/635; 48/215
[58] Field of Search ................. 252/323; 48/212, 215; 585/415, 540, 541, 635

[56] References Cited

U.S. PATENT DOCUMENTS

| | | |
|---|---|---|
| 2,968,683 | 1/1961 | Kossmann . |
| 3,022,148 | 2/1962 | James . |
| 3,119,378 | 1/1964 | Marshall . |
| 3,138,438 | 6/1964 | Peras . |
| 3,242,586 | 3/1966 | Peterson . |
| 3,414,247 | 12/1968 | Sama . |
| 3,541,179 | 11/1970 | Okagami et al. . |
| 4,021,193 | 5/1977 | Waters . |

FOREIGN PATENT DOCUMENTS

| | | |
|---|---|---|
| 076704 | 4/1983 | European Pat. Off. . |
| 1182135 | 1/1959 | France . |
| 79/2007 | 4/1979 | South Africa . |
| 1399137 | 6/1975 | United Kingdom . |

OTHER PUBLICATIONS

PCT WO81/02057, Publ., Jul. 23, 1981.
"Spouted Beds", Mather & Epstein, Academic Press, 174, Chem. 10 & 11, pp. 231-233, 236-241.

*Primary Examiner*—Howard T. Mars
*Attorney, Agent, or Firm*—Morgan & Finnegan

[57] ABSTRACT

Process for the production of synthesis gas and higher hydrocarbons in which a saturated hydrocarbon and an oxygen containing gas having a ratio of hydrocarbon to oxygen of greater than the stoichiometric ratio for complete combustion are introduced into a bed of an inert particulate material. The upward flow rate of the hydrocarbon/oxygen containing gas stream is sufficient to fluidize or to produce a spouting action of the bed material, whereby the particulate material is thrown up above the bed surface and subsequently falls back into the bed. The hydrocarbon and oxygen containing gas are ignited reacted together, and the products of the reaction withdrawn.

20 Claims, 1 Drawing Sheet

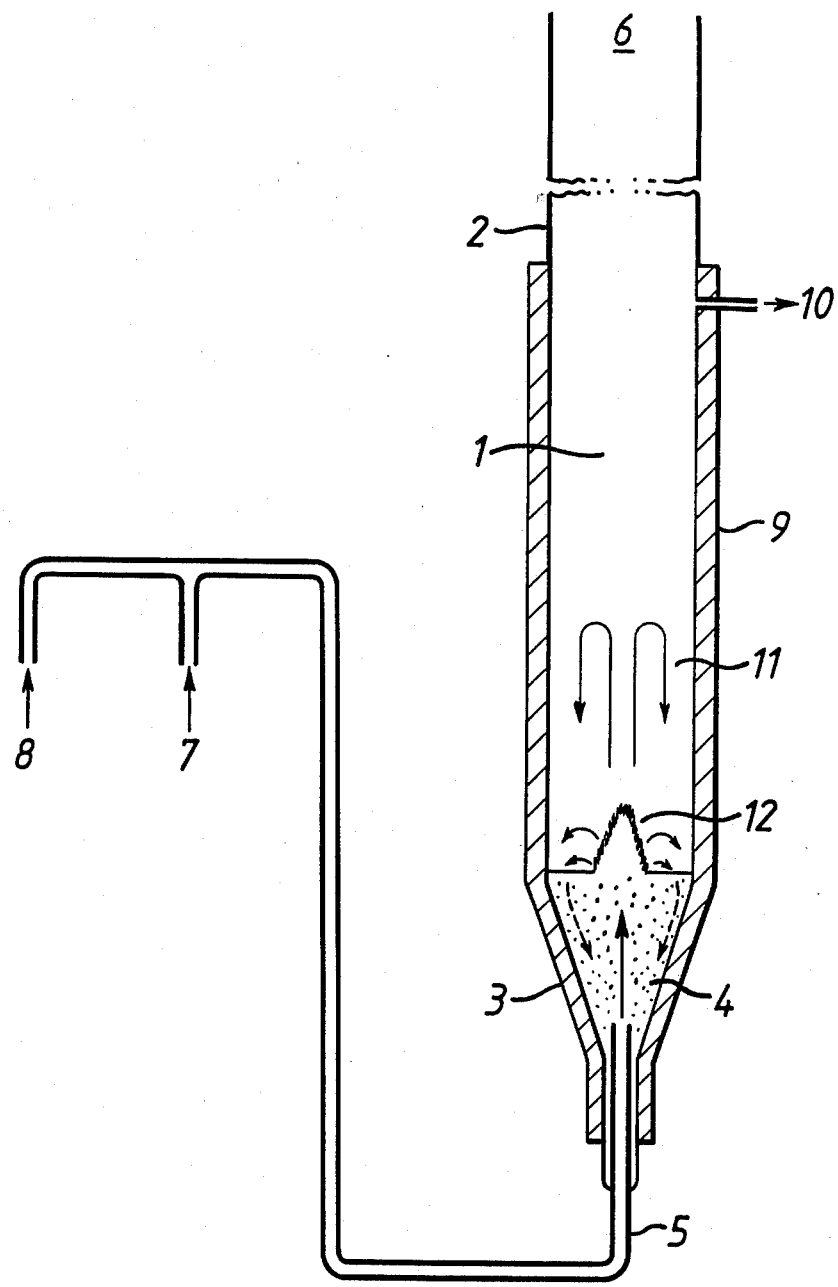

PROCESS FOR PRODUCING SYNTHESIS GAS BY PARTIAL COMBUSTION OF HYDROCARBONS

This is a continuation of co-pending application Ser. No. 800,124, filed on as PCT GB85/00141 on Apr. 2, 1985, published as WO85/04647 on Oct. 24, 1985, now abandoned.

The present invention relates to a process for the production of a mixture of gases comprising carbon monoxide and hydrogen (hereinafter referred to as synthesis gas) and higher hydrocarbons in a particulate bed reactor.

The use of fluidised beds for various applications is well known. The fluidisation process involves flowing gas through a bed of particulate material at a rate at which the bed becomes highly turbulent and rapid mixing of the particles occurs. Materials may be introduced to and be reacted in the bed.

Spouted bed technology comprises passing a high velocity stream of gas vertically upwards through a mass of solid particles. The high velocity gas stream causes the particles to ascend rapidly in a hollowed central spout within the bed. In addition to particle motion within the spout there is some particle back mixing in the area surrounding the spout giving a particle circulation pattern outside the spout. The feed gas may have sufficient upward flow to create a fountain of particles above the bed or in a deeper bed may give a very high circulation rate of solid particles within the bed. In each case a cycle of solid particle movement is established. A review of developments in spouted bed technology appears in the Canadian Journal of Chemical Engineering, Volume 52, page 129, 1974.

It has now been found that fuel rich flames can be stabilised in a particulate bed reactor and that the exist gas stream contains useful products.

Thus according to the present invention there is provided a process for the production of synthesis gas and higher hydrocarbons in which (a) a saturated hydrocarbon and an oxygen containing gas having a ratio of hydrocarbon to oxygen of greater than the stoichiometric ratio for complete combustion are introduced into a bed of an inert particulate material, (b) the upward flow rate of the hydrocarbon/oxygen containing gas stream being sufficiently large to fluidise or to produce a spouting action of the bed material, whereby at least a part of the particulate material is thrown up above the bed surface and subsequently falls back into the bed, (c) the hydrocarbon and oxygen containing gas being ignited and reacted together and (d) the products of the reaction being withdrawn.

The invention includes a process having a bed in which the upward flow rate of the hydrocarbon/oxygen containing gas stream causes surface bubbling of the bed sufficient to throw particulate material up into the freeboard.

The invention also includes a process in which the upward flow rate of the hydrocarbon/oxygen containing gas stream forms a fountain of particles above the bed surface, the particles falling back into the bed.

The hydrocarbon and oxygen containing gas may be pre-mixed before being introduced into the bed through a nozzle. Alternatively the reactant gases may be allowed to mix at the point of injection to the bed.

The saturated hydrocarbon is preferably a gaseous paraffinic hydrocarbon such as substantially pure methane or ethane or mixtures of hydrocarbons comprising substantial proportions of methane and/or ethane, for example those obtained from natural hydrocarbon gas reservoirs which may also contain significant quantities of carbon dioxide. The oxygen containing gas may be for example air or an air/oxygen mixture. Also the oxygen containing gas may be pure oxygen.

The hydrocarbon and/or the oxygen containing gas may be preheated, if required prior to introduction to the bed.

The reactor may also be equipped with ancillary heating means, for example, heating coils in the bed or by direct fired heating of the reactor walls.

The preferred composition of the saturated hydrocarbon/oxygen containing gas mixture is pressure dependent. At atmospheric pressure the preferred composition is 1.1 to 5 times the stoichiometric ratio of hydrocarbon/oxygen for complete combustion but these limits are extendible if operation at system pressures of greater than atmospheric are envisaged. Commercial reactor systems would probably be operated at pressures above atmospheric and up to 50 bar or even higher.

The particulate bed material may be an inert temperature resistant refractory material which may include firebrick, quartz, carborundum, zirconia, silicon carbide, ceramics and certain forms of carbon e.g. high density coke may be used.

The shape of the particulate bed material may be, for example, spherical, cylindrical, or amorphous. The particle size may vary from 0.01 to 10 mm in diameter dependent upon the particle density, the diameter of the reactor and feed inlet, and the feed gas flow rate. The particle size distribution is preferably as uniform as possible.

The materials of construction of the reactor vessel may be for example steel, quartz, carbon fibre or refractory material dependent upon material availability and location and size of the reactor. The reactor may be insulated to reduce heat loss.

The reaction may be initiated in a number of ways. For example, the particulate bed material may be preheated by igniting and burning a near stoichiometric mixture in the bed until the bed temperature is great enough to sustain the combustion of the excess stoichiometric hydrocarbon/oxygen mixtures. A typical steady state bed temperature is of the order 500°–1500° C.

The products of the reaction are preferably withdrawn from above the bed. The preferred products include acetylene, ethylene and synthesis gas (carbon monoxide and hydrogen) and quantities of aromatic products e.g. benzene.

The reactor vessel containing the bed of particulate material may be shaped so as to encourage recirculation of bed particles in a vertical direction. For a single inlet feed nozzle, the preferred shape of the base portion is conical. The cone angle measured from the vertical is preferably from 10° to 40°.

In order to reduce the amount of carbon (soot) formation in the final product, steam or water may be injected into the bed together with the reactant gases and/or injected into the product gases as a quench. This is particularly desirable when operating at pressures greater than one bar. It is believed that the injection of steam or water (quenching) reduces the temperature of the product gases and stops or reduces further reaction to less useful products and/or soot. An alternative mode of quench is envisaged if it is required to increase the amount of unsaturated hydrocarbons in the product gases. This mode comprises the injection of, for example, a liquid saturated hydrocarbon e.g. propane, butane or gasoline, into the hot product gases and to thereby increase the content of light unsaturated hydrocarbons e.g. ethylene, acetylene in the product gases.

It is also envisaged that for the conversion of large quantities of hydrocarbon and oxygen containing gas, an array of reactors could be used. Also a single bed containing one or more adjacent inlet nozzles may be used.

It is also possible if desired to introduce further gaseous hydrocarbon to the bed through a further nozzle or nozzles. This further hydrocarbon feed may have the same composition as the saturated hydrocarbon feed or may be different. The further nozzle or nozzles may direct the further hydrocarbon feed in a counter current, parallel, perpendicular or other direction relative to the spouting hydrocarbon gas feed direction.

The invention will now be described by way of example only and with reference to the accompanying drawing.

The drawing shows a schematic layout of a reactor and ancillary equipment.

The reactor 1 takes the form of a lagged elongate quartz column 2 having a conical base portion 3, the angle of the cone from the vertical being 20°. The base portion of the reactor contains a slumped bed 4 of particulate material having a particle size of the order 1–1.5 mm diameter. The particulate materials were crushed firebrick, silicon carbide, quartz and zirconia. The base of the column is adapted to receive a nozzle 5 for the introduction of reactants. The nozzle outlet may be adjusted vertically within the bed of particulate material. The upper portion 6 of the reactor is open to form an outlet for withdrawal of the product gases. A line 10 enables samples of the products to be withdrawn from the product gas stream.

The nozzle 5 is connectable to a supply of air 7 or other oxygen containing gas under appropriate pressure and to a supply of methane 8. A suitable supply may comprise cylinders of hydrocarbon e.g. methane, and air or oxygen linked to the nozzle through a mixer and gas pressure and flow rate measuring devices such as manometers and rotameters (not shown).

The reactor may also have an additional nozzle or nozzles for supplying further methane or other hydrocarbon to the bed (not shown in the drawing). The reactor 1 is lagged with a suitable insulating material 9.

A number of techniques may be used for start up of the reactor. In the present example, the ignition source was a gas burner (not shown) located at the outlet portion 6 of the column.

During start up of the reactor, a pre-mixed gas stream of hydrocarbon and air was passed under pressure to the nozzle 5 in the base portion 3 of the column. The velocity of the gas stream was sufficient to cause a fountain 11 of bed particles in the freeboard above the bed.

The gas stream used was very fuel rich and consequently the gas mixture was ignited by the gas burner and a flame stabilised at the exit of the reactor. The air flowrate was increased, bringing the mixture closer to stoichiometric, until the flame began to move slowly back down the reactor. A flame was stabilised at the surface of the slumped bed and the fuel flowrate reduced slightly to obtain a near stoichiometric mixture. When the bed temperatures had equilibrated, the fuel flowrate was increased and a low flowrate of oxygen was added to the bed. The air flowrate was then reduced and both the fuel and the oxygen increased to maintain the stable flame and the spouting action of the bed. This procedure was repeated until the feed composition was entirely fuel and oxygen. The total feed mixture was always maintained on the rich side of stoichiometric close to or beyond the rich limit of flammability. At atmospheric pressure, the rich limit of flammability corresponds to a methane/oxygen mole ratio of 1.5.

The constituents and composition of the reactant gases were ascertained by means of conventional techniques. This procedure was repeated for a number of fuel rich hydrocarbon/oxygen reactant compositions and different particulate bed materials. The products obtained from the reaction may include carbon monoxide and hydrogen (synthesis gas), acetylene, and ethylene.

Table 1 shows results for the reaction of methane and oxygen in a reactor using various bed materials. The bed materials generally had particle size of 1 to 1.5 mm diameter and were crushed firebrick, quartz and silicon carbide. The increased carbon molar selectivities to $C_2$ and higher hydrocarbons is shown for all the bed materials for fuel rich conditions as the feed composition is made increasingly fuel rich up to and beyond the rich limit of flammability.

Table 2 shows results for the reaction of methane and air in a reactor. The bed material used was zirconia spheres of the order 1–1.2 mms diameter. The carbon molar selectivities and feed conversions achieved are similar to those obtained with oxygen.

Calculations have shown that the residence time of the reactant gases in the hot zone is desirably less than 1 millisecond in order to avoid an undesirably high degree of cracking of the products to soot or other compounds. It may be possible to use longer residence times at low or atmospheric pressures.

The following experiments relate to an alternative process mode in which a lower velocity gas stream was used so as to cause fluidisation of the bed material and/or surface bubbling of the bed material. The fluidisation and/or bubbling was sufficient to cause the particulate material to be thrown up into the freeboard, the material returning to the bed.

Table 3 shows results obtained in a fluidised bed reactor with a methane/oxygen feed. The bed comprised 0.25–0.85 mm particles of zirconia. The reactant gases were fed to the reactor through a distributor plate at a sufficient velocity to attain turbulent fluidisation with bed material thrown randomly into the gas phase or freeboard above the bed.

Experiments with fuel rich mixtures close to or beyond the limit of flammability using conventional fluidised bed operation at one bar pressure and with an inert bed material generally resulted in flame lift off or instability. At the onset of surface bubbling (or localised spouting) a more stable combustion regime ensued and partial oxidation with production of $CO/H_2$ and $C_2$'s resulted. This effect persisted into the complete spouting regime. It is believed that the stable combustion of mixtures close to or beyond the limit of flammability results from the countercurrent heat transfer between the descending hot particulate material and the ascending gases thereby enabling pre-heat of incoming feed gases.

As the pressure of operation is increased the upper flammability is extended to richer mixtures. Thus, the need for particulate heat recirculation for stable combustion is greater at lower operating pressures than at higher operating pressures. However, by application of the present invention, the limit of flammability can be further extended at increased pressures by particulate heat recirculation in a similar way as at atmospheric pressure.

TABLE 1

Conversion of methane and oxygen using various bed materials

| Run No. | Feed inlet gas composition (% mole) $O_2$ | $CH_4$ | $N_2$ | Total Flowrate (l/min) | Feed ($CH_4/O_2$) (Mole ratio) | % Conversion of $CH_4$ feed | Exit dry gas composition (% mole) $N_2$ | $H_2$ | CO | $CO_2$ | $CH_4$ | $C_2$'s | $C_3-C_6$ | aromatic | Carbon Molar Selectivity to $C_2$ and higher hydrocarbons (%) | Bed Material |
|---|---|---|---|---|---|---|---|---|---|---|---|---|---|---|---|---|
| 1 | 32.9 | 63.7 | 3.4 | 10.7 | 1.93 | 70.9 | 3.6 | 42.0 | 23.3 | 3.3 | 18.7 | 8.7 | 0.2 | 0.1 | 36.2 | Firebrick |
| 2 | 43.8 | 53.4 | 2.8 | 11.0 | 1.22 | 90.3 | 2.9 | 48.6 | 35.1 | 5.0 | 5.1 | 3.2 | 0.01 | 0.04 | 13.2 | Firebrick |
| 3 | 51.3 | 46.2 | 2.5 | 11.3 | 0.90 | 99.4 | 3.2 | 47.0 | 37.2 | 12.2 | 0.3 | 0.1 | 0 | 0.01 | 0.3 | Firebrick |
| 4 | 38.2 | 58.9 | 2.9 | 16.0 | 1.54 | 87.1 | 2.8 | 51.9 | 26.7 | 2.5 | 7.2 | 7.6 | 0.2 | 0.13 | 38.3 | Firebrick |
| 5 | 36.2 | 59.2 | 4.6 | 23.1 | 1.64 | 82.3 | 4.6 | 49.9 | 23.3 | 3.1 | 10.6 | 8.1 | 0.1 | 0.23 | 36.8 | Firebrick |
| 6 | 36.6 | 59.4 | 4.0 | 23.1 | 1.62 | 91.8 | 3.4 | 55.4 | 26.4 | 3.4 | 4.1 | 7.1 | 0 | 0.16 | 33.6 | Quartz |
| 7 | 36.5 | 59.2 | 4.4 | 23.5 | 1.62 | 90.6 | 4.0 | 52.7 | 26.4 | 3.3 | 5.1 | 8.1 | 0.1 | 0.18 | 36.2 | Silicon carbide |

TABLE 2

Conversion of methane and air using zirconia bed material

| Total Flow Rate (liters/min) | Feed Ratio ($CH_4/O_2$) | % Conversion of $CH_4$ feed | % Carbon Molar Selectivity $C_2+$ | CO | $CO_2$ | soot | Bed Temperature (°C.) | Product Gas $H_2/CO$ (Mole Ratio) |
|---|---|---|---|---|---|---|---|---|
| 45 | 1.18 | 92 | 27 | 63 | 10 | 0 | 1040 | 1.6 |
| 33 | 1.23 | 89 | 27 | 61 | 11 | 1 | 1065 | 1.6 |

TABLE 3

Conversion of methane and oxygen in a fluidised bed reactor using zirconia bed material

| Gas Hourly Space Velocity (hour$^{-1}$) | Feed Ratio ($CH_4/O_2$) | % Conversion of $CH_4$ feed | % Carbon Molar Selectivity $C_2+$ | CO | $CO_2$ | Bed Temperature (°C.) | Product Gas $H_2/CO$ (Mole Ratio) |
|---|---|---|---|---|---|---|---|
| 25300 | 1.54 | 67 | 33 | 58 | 8 | 1050 | 1.1 |
| 19000 | 1.70 | 85 | 40 | 46 | 10 | 1000 | 2.1 |

We claim:

1. A process for the production of hydrogen and carbon monoxide containing synthesis gas and higher hydrocarbons in which (a) a saturated hydrocarbon and an oxygen containing gas having a ratio of hydrocarbon to oxygen of greater than the stoichiometric ratio for complete combustion are introduced into a bed of an inert particulate material, (b) the upward flow rate of the hydrocarbon/oxygen containing gas stream being sufficient to produce a spouting action of the bed material, whereby at least a part of the particulate material is thrown up above the bed surface and subsequently falls back into the bed, (c) the hydrocarbon and oxygen containing gas being ignited and reacted together, and (d) the products of the reaction being withdrawn.

2. A process according to claim 1 in which the upward flow rate of the hydrocarbon/oxygen containing gas stream causes surface bubbling of the bed.

3. A process according to claim 1 in which the upward flow rate of the hydrocarbon/oxygen containing gas stream forms a fountain of particles above the bed surface, the particles falling back into the bed.

4. A process according to claim 1 in which the hydrocarbon and oxygen containing gas are pre-mixed prior to introduction to the bed.

5. A process according to claim 1 in which the hydrocarbon gas comprises methane, ethane or natural gas.

6. A process according to claim 1 in which the oxygen containing gas is oxygen or air.

7. A process according to claim 1 in which the hydrocarbon and/or the oxygen containing gas are pre-heated prior to introduction to the bed.

8. A process according to claim 1 in which the composition of hydrocarbon gas and oxygen containing gas is 1.1 to 5 times the stoichiometric ratio of hydrocarbon/oxygen for complete combustion.

9. A process according to claim 1 operated at a pressure of greater than atmospheric pressure.

10. A process according to claim 1 in which the bed of particulate material comprises firebrick, quartz, carborundum, zirconia, silicon carbide, ceramic or forms of carbon.

11. A process according to claim 10 in which the particulate size diameter is 0.01–10 mm.

12. A process according to claim 1 in which the bed has ancillary heating means.

13. A process according to claim 1 in which the reaction is initiated by preheating the bed material by igniting and burning a near stoichiometric hydrocarbon-/oxygen containing gas mixture in the bed until the bed temperature is sufficient to sustain combustion of an hydrocarbon/oxygen containing gas mixture having a ratio of hydrocarbon to oxygen of greater than the stoichiometric ratio for complete combustion.

14. A process according to claim 1 in which the reaction is quenched.

15. A process according to claim 14 in which the reaction is quenched by the introduction of steam or water.

16. A process according to claim 14 in which the reaction is quenched by the introduction of a liquid saturated hydrocarbon into the hot product gas.

17. A process according to claim 1 in which further hydrocarbon gas is introduced to the bed.

18. A process according to claim 17 in which the further hydrocarbon gas is different in composition or constitution from the hydrocarbon gas.

19. A process according to claim 17 in which the further hydrocarbon gas is introduced parallel, perpendicular, or countercurrent to the hydrocarbon/oxygen containing gas mixture.

20. A process according to claim 1 which is carried out in one or more particulate beds.

* * * * *

UNITED STATES PATENT AND TRADEMARK OFFICE
CERTIFICATE OF CORRECTION

PATENT NO. : 4,767,569
DATED : August 30, 1988
INVENTOR(S) : John H. Brophy et al It is certified that error appears in the above-identified patent and that said Letters Patent is hereby corrected as shown below:

Column 1, line 34 "exist" should read --exit--.

Signed and Sealed this

Thirty-first Day of January, 1989

Attest:

DONALD J. QUIGG

*Attesting Officer*   *Commissioner of Patents and Trademarks*